No. 730,506.

Patented June 9, 1903.

UNITED STATES PATENT OFFICE.

CUSHING ADAMS, OF BELLOWS FALLS, VERMONT.

PAINT AND PROCESS OF PRODUCING SAME.

SPECIFICATION forming part of Letters Patent No. 730,506, dated June 9, 1903.

Application filed December 15, 1902. Serial No. 135,217. (No specimens.)

*To all whom it may concern:*

Be it known that I, CUSHING ADAMS, a citizen of the United States, residing at Bellows Falls, in the county of Windham and State of Vermont, have invented or discovered certain new and useful Improvements in Paints and Processes for Producing Same, of which the following is a specification.

This invention or discovery has for its object to provide a paint or coating composition which may be properly mixed, and which when mixed will be of such a character that the mineral base thereof will not have a tendency to settle or separate from the water of the mixture; also, to produce a waterproof and weatherproof surface, the paint or coating being of such a character that it will adhere strongly to the parts or surfaces to which it may be applied.

My improved paint or coating composition comprises a mineral base—as talc, whiting, gypsum, or kaolin—preferably consisting of kaolin and gypsum in about equal proportions; or it may consist entirely of either kaolin or of gypsum alone, or it may consist entirely of any one of the other materials just mentioned. Combined with this mineral base is an adhesive consisting of casein which has been previously treated with an alkaline material—such as borax, carbonate of soda, or soda-ash, but preferably with soda-ash—and I add alum or its chemical equivalent to the mineral base and adhesive for the purpose of giving a jelly-like body to the paint or coating mixture and also to augment the hardening and water-resisting qualities of the paint or coating composition when a suitable quantity of water has been added to the dry components to form the paint or coating, and I also add lime to the composition to give it water-resisting qualities in addition to those qualities which are obtained by the use of alum.

In carrying my invention or discovery into effect I take about seven parts of an alkali or an alkaline substance—as borax, carbonate of soda or soda-ash, preferably soda-ash—and dissolve the same in cold water and add this alkaline solution to about ninety-three parts of crude dry casein, which will so readily absorb the alkaline mixture as to still remain in a practically dry condition, and this mixture so obtained of alkali or an alkaline substance and casein is next ground to a powder. I then take about fifteen parts of this casein and alkaline mixture in a dry condition and mix the same with a mineral base, consisting, preferably, of about thirty-seven and one-half parts of dry powdered kaolin and thirty-seven and one-half parts of dry powdered gypsum, or the mineral base may be wholly either of kaolin or gypsum alone, or it may be of any of the other basic materials hereinbefore mentioned. I then add to this mixture about ten parts of dry powdered lime and one part of dry powdered alum or its chemical equivalent, as soluble salts of aluminium or aluminium hydroxid. These powdered ingredients are then thoroughly mixed together to form the paint composition, which is now in condition to be put upon the market in a dry powdered form.

In preparing the paint composition for use about one hundred and twenty parts of cold water, by weight, are added to the powdered mixture or preparation, and the whole is then thoroughly stirred up together. The addition of the alum to the casein and mineral-base mixture gives a jelly-like body to the liquid mixture, so that the mineral base does not separate or settle in the liquid mixture, but is held in suspension mechanically in the somewhat thick and viscous fluid, without, however, deteriorating from the capacity of the same to be easily and thinly spread upon the surfaces to be painted or coated, the addition of the alum having a contracting effect hardens the coating and increases its waterproofing or water-resisting qualities.

I do not wish to be understood as limiting my invention or discovery to the exact proportions of the ingredients hereinbefore stated, as these may be varied somewhat without essentially changing the results aimed at.

Having thus described my invention or discovery, I claim and desire to secure by Letters Patent—

1. The herein-described paint composition, consisting of a mineral base, casein, an alkaline substance, lime and alum, in substantially the proportions specified.

2. The herein-described paint composition, consisting of a mineral base, casein, soda-ash, lime and alum, in substantially the proportions specified.

3. The herein-described paint composition consisting of kaolin, gypsum, casein, an alkaline substance, lime and alum, in substantially the proportions specified.

4. The herein-described paint composition, consisting of kaolin, gypsum, casein, soda-ash, lime and alum, in substantially the proportions specified.

5. The herein-described process for producing a paint composition, the same consisting in mixing a solution of an alkaline substance with casein, grinding the mixture to powder, and then combining about fifteen parts of the mixed casein and alkaline substance with about seventy-five parts of a mineral base, ten parts of lime and one part of powdered alum.

6. The herein-described process for producing a paint composition, the same consisting in mixing a solution of soda-ash with casein, grinding the mixture to powder, and then combining about fifteen parts of the casein and soda-ash mixture with about seventy-five parts of a mineral base, ten parts of lime and one part of powdered alum.

In testimony whereof I affix my signature in presence of two witnesses.

CUSHING ADAMS.

Witnesses:
C. M. SWEENEY,
ARTHUR W. CALVERT.